United States Patent [19]

Heim et al.

[11] Patent Number: 5,611,420

[45] Date of Patent: Mar. 18, 1997

[54] DOUGH-HANDLING MACHINE

[75] Inventors: John P. Heim, Sewell, N.J.; John Carmichael, Etiwanda, Calif.

[73] Assignee: J & J Snack Foods Corp., Pennsauken, N.J.

[21] Appl. No.: 508,050

[22] Filed: Jul. 27, 1995

[51] Int. Cl.⁶ .................................................. B65G 37/00
[52] U.S. Cl. ..................................... 198/371.2; 198/358
[58] Field of Search .............................. 198/371.2, 358, 198/572, 573, 603, 577; 131/909, 282

[56] References Cited

U.S. PATENT DOCUMENTS

| | | |
|---|---|---|
| 1,190,800 | 7/1916 | Repass . |
| 3,010,160 | 11/1961 | Lytton et al. ........................ 198/371.2 |
| 3,365,083 | 1/1968 | Baumann et al. . |
| 3,731,787 | 5/1973 | Gregor .................................... 198/358 |
| 3,842,994 | 10/1974 | Theurer et al. . |
| 4,119,193 | 10/1978 | Smith et al. . |
| 4,428,572 | 1/1984 | Burke . |
| 4,541,824 | 9/1985 | Muller . |
| 4,614,264 | 9/1986 | Fishburne ............................... 198/572 |
| 4,895,241 | 1/1990 | Silenius . |
| 4,909,699 | 3/1990 | Tandy et al. . |
| 5,009,548 | 4/1991 | Falbo et al. . |
| 5,170,877 | 12/1992 | Francioni ............................... 198/358 |
| 5,183,143 | 2/1993 | Sullivan, Jr. ........................... 198/609 |

*Primary Examiner*—William E. Terrell
*Assistant Examiner*—Khoi H. Tran
*Attorney, Agent, or Firm*—Quarles & Brady

[57] ABSTRACT

Apparatus is disclosed for prioritized distribution of dough logs from a dough mixing or supply system to a series of production lines. The device includes an input conveyor and an output conveyor, each having an upstream end and a downstream end, a plurality of distribution conveyors placed in succession to one another along a conveying path and capable of transversely carrying dough logs downstream thereon in a first direction. Each of the distribution conveyors has an upstream end and a downstream end and is upwardly inclined in one direction with the downstream end of each of the distribution conveyors overlapping an upstream end of a successive one of the distribution conveyors. Sensor are provided and associated with each of the input conveyor, the distribution conveyors, and the output conveyor, for detecting dough logs transported thereon. A programmable controller is provided for controlling the operation of each of the input conveyor, the distribution conveyors, and the output conveyor based on information received from the sensors, for selective discharge of dough logs.

21 Claims, 2 Drawing Sheets

DOUGH-HANDLING MACHINE

FIELD OF THE INVENTION

The present invention relates to an apparatus for the distribution of dough logs from an input conveyor to a series of hoppers associated with dough-processing machines. The invention includes a plurality of inclined distribution conveyors and an output conveyor positioned in overlapping relation to one another, in combination with dough sensors to assist in the control of product flow. A programmable control unit is provided to monitor and control all aspects of conveyor operation based on data received from the dough sensors. The dough is passed from conveyor to conveyor and discharged to said hoppers in a prioritized manner which ensures that each hopper receives sufficient quantities of dough, and that no hoppers are overfilled or starved.

DESCRIPTION OF THE PRIOR ART

Industrial baking processes which use large quantities of dough to create various food products, suffer from a common problem with respect to dough handling. Specifically, in a typical production situation, it is often desirable to distribute dough to a plurality of separate dough-processing machines which operate in parallel with one another. Further, it is desirable to provide delivery of dough to each processing machine at a rate which ensures that hoppers associated with each of the dough-processing machines are neither overfilled nor starved for dough. Conventional techniques for sorting and delivery of product have been found to suffer from various difficulties in the dough-handling field due largely to the nature and texture of the dough products being delivered. Specifically, dough logs may weigh in excess of twenty (20) pounds, and typically have a texture which sticks to conveyors and/or pusher surfaces, thereby making it difficult to utilize ordinary product-handling techniques.

Further, product-handling apparatus of the prior art have not provided a satisfactory method for prioritizing delivery of dough logs to a series of hoppers for dough-processing machines arranged to operate in parallel with one another. Prior art systems commonly resulted in individual dough-processing machines receiving either too much or too little dough to operate efficiently. This problem is particularly acute in situations where one of several dough-processing production lines is temporarily shut down for repairs and/or maintenance while other production lines continue to run.

BRIEF SUMMARY OF THE INVENTION

An object of the present invention is to provide an apparatus which is capable of automatically delivering dough logs to a series of dough-processing machines operating parallel. It is a further object of this invention to provide automated dough delivery with prioritization to ensure that no dough-processing machine being supplied with dough by the system is overfilled or starved for dough logs, regardless of whether a particular one of the dough-processing machines has been turned off for maintenance or repair.

The present invention concerns an apparatus for the prioritized distribution of dough logs into the hoppers of a plurality of successive dough-handling machines. Briefly, the invention is comprised of an input conveyor, a plurality of distribution conveyors and an output conveyor placed in succession to one another along a conveying path. Each of the conveyors has an upstream end and a downstream end and is capable of transversely carrying dough logs downstream thereon in a first direction along the conveying path. The distribution conveyors are upwardly inclined in the downstream direction and the downstream end of each of the distribution conveyors is positioned so that it overlaps an upstream end of a successive one of the distribution conveyors. In the case of the last downstream distribution conveyor, the downstream end overlaps the upstream end of the output conveyor. The input conveyor is placed upstream from the succession of distribution conveyors with its downstream end overlapping the upstream end of a first one of the distribution conveyors.

With the foregoing arrangement, dough conveyed to a downstream end of the input conveyor and each of the distribution conveyors, will drop off such end and will be drawn by force of gravity to land on the upstream end of the next conveyor in the succession. In this manner, dough is passed from conveyor to conveyor along the conveying path.

Sensor means are provided and associated with each one of the input conveyor, the distribution conveyors, and the output conveyor, for detecting dough logs transported thereon. Programmable controller means are provided for controlling the operation of each of the input conveyor, the distribution conveyors, and the output conveyor based on information received from the sensors. The programmable controller includes memory for storing data tables. Each of the sensor means is electrically connected to the programmable controller and the programmable controller is capable of controlling the operation of each of the conveyors.

Each of the distribution conveyors and the output conveyors is capable of reversing its conveying direction from the first direction described above, to an opposite second direction, upon command from the programmable controller. When such conveyors operate in their reverse direction, dough is conveyed to the upstream end of the output conveyor and each of the distribution conveyors. When the dough reaches such upstream end, it will thereafter drop off the conveyor end, preferably to be received by a hopper associated with a production line for further dough processing. In this way, each of the conveyors can discharge at its upstream end, dough traveling along the conveying path. The discharged dough from the system can thus be provided to a production line associated with each of the distribution conveyors.

In a preferred embodiment of the invention, the dough-handling apparatus provides for the discharge of dough from the distribution conveyors and output conveyor in a manner which is prioritized by the programmable controller. Specifically, the sensor means associated with each of such conveyors includes a position sensor for detecting the presence of a dough log received at an upstream end of the conveyor and an accumulation sensor for detecting when a dough log is discharged from each of the conveyors at its upstream end.

Further, the programmable controller maintains a dough dump interval timer for each of the distribution conveyors and the output conveyor for determining an elapsed time associated with such conveyors. The programmable controller includes means for receiving an initialization control signal from each of the production lines associated with the distribution conveyors and the output conveyor. The initialization control signal is provided for the output conveyor and each distribution conveyor for indicating that the production line associated with the particular conveyor is both active and low on dough. Upon receipt of the initialization control signal, the programmable controller initiates the dough dump interval timer for a particular distribution conveyor or output conveyor associated with the production line from which the initialization control signal has been received.

Further, each of the accumulation sensors provided for each of the distribution conveyors and the output conveyor provides a timer reset signal associated with such conveyor. The timer reset signal is generated by the accumulation sensor when a dough log located on one of the conveyors is discharged from the conveyors' upstream end. The timer reset signal is received by the programmable controller, which event causes the controller to reset to zero the elapsed time accumulated on the dough dump interval timer associated with the particular conveyor.

The distribution or output conveyor associated with the dough dump interval timer having the greatest elapsed time has the highest priority for discharging dough. To ensure that the conveyor with the highest priority receives dough first, the controller will inhibit dough discharge from all upstream distribution conveyors when a downstream conveyor has higher priority, i.e. a higher elapsed time on its dough dump interval timer.

According to the invention, each of the distribution conveyors and the output conveyor, beginning with the output conveyor and proceeding seriatim with each upstream conveyor, will temporarily stop conveying when: (1) a position sensor associated with a conveyor detects the presence of dough thereon, and (2) when all of the dough dump interval timers of downstream output and distribution conveyors are set to zero. These conditions exist when all of the dough-processing production lines have sufficient dough and more dough is available.

Any distribution conveyor and/or output conveyor which has temporarily stopped, as described above, will thereafter discharge dough located thereon when the elapsed time accumulated on the dough dump timer associated with the particular conveyor exceeds zero, and is greater than the elapsed time on each dough dump interval timer associated with a downstream distribution conveyor.

If all position sensors associated with distribution conveyors and the output conveyor detect dough thereon, and additional dough is detected by the sensor associated with the input conveyor, then the output conveyor will convey dough located upon it, in a downstream direction, to an excess dough bin. Under these circumstances, all of the distribution conveyors located upstream of the output conveyor will convey dough located upon them to the next adjacent downstream conveyor. Such dough may then be discharged as may be necessary to supply dough to the various production lines.

In an alternative embodiment of the invention designed to avoid discharge of dough to an excess dough bin, the programmable controller may be provided with a data communication link to a dough mixing unit or other dough feeding device. Based upon information received (1) with respect to initialization control signals for each distribution conveyor (2) from dough sensors regarding the number of conveyors which are in the loaded, stopped position and (3) upon data tables, the programmable controller determines when the dough handling machine has, or is about to, receive an excessive amount of dough. When a condition is thus detected where the dough handling system has, or is about to, receive an excessive amount of dough, the programmable controller electronically communicates with the dough mixer or other dough feeding device to decrease the rate of dough production and/or delivery. The programmable controller will continue to monitor the amount of dough being requested from each distribution conveyor, as well as the amount of dough positioned upon distribution conveyors in a stopped position, in order to determine if dough rate of supply has been sufficiently reduced so as not to result in oversupply of dough to the dough handling machine. In the event that the reduction in rate of dough production and/or delivery continues to be excessive and the dough rate of supply cannot be further reduced, then the programmable controller will electronically communicate with the dough mixer or other dough feeding device to cause them to shut down temporarily.

Similarly, if the programmable controller determines, based upon information received from (1) initialization control signals for each distribution conveyor (2) from dough sensors and (3) upon data tables, that the dough-handling machine has, or is about to, receive insufficient dough to satisfy production line demands, then the programmable controller will compensate by communicating to said dough mixer and/or dough feeding device by means of said communication link, to increase the rate of dough production and delivery.

DETAILED DESCRIPTION OF THE INVENTION

Figure 1:
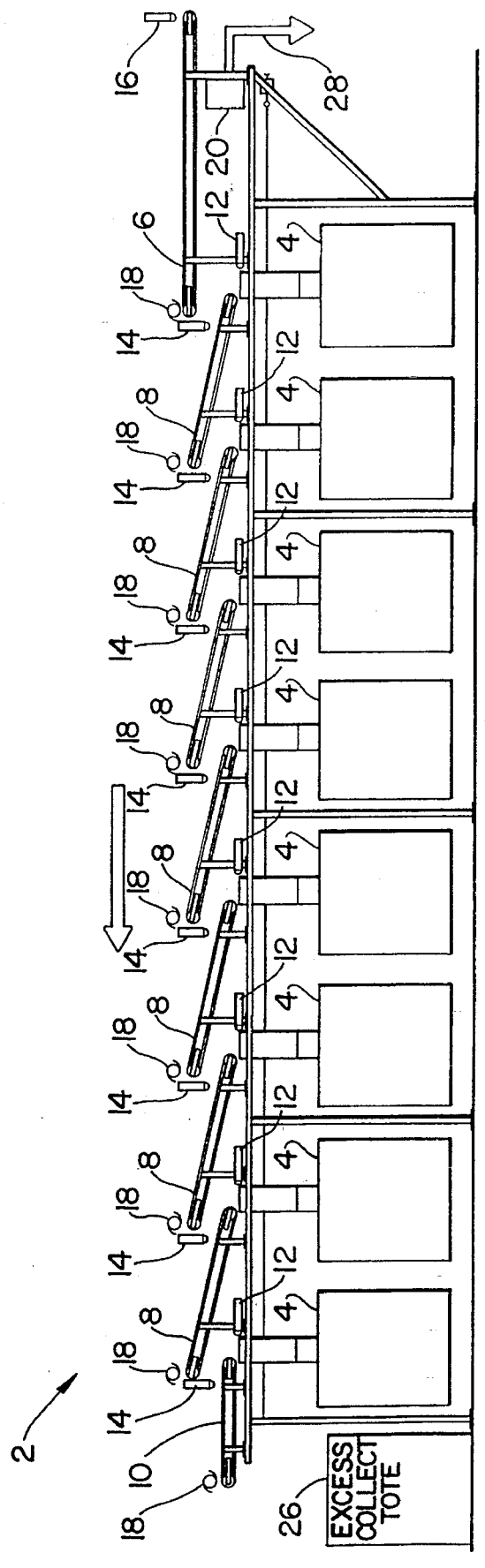
FIG. 1 is a side view schematically showing the dough-handling device according to the present invention.

Referring to FIG. 1, the present invention concerns an apparatus 2 for the prioritized distribution of dough logs into the hoppers 4 of a plurality of dough-processing machines (not shown) operating in parallel with one another. The invention is comprised of an input conveyor 6, a plurality of distribution conveyors 8 and an output conveyor 10 placed in succession to one another along a conveying path. Each of the conveyors 6, 8, 10 has an upstream end, defined as the end nearest to input conveyor 6, and a downstream end defined as the conveyor end nearest to output conveyor 10. Further, each of said conveyors 6, 8, and 10 is capable of transversely carrying dough logs in the downstream direction shown by the reference arrow in FIG. 1, i.e. in a direction from input conveyor 6 towards output conveyor 10. According to the invention, the conveyors 6, 8, 10 are preferably either belt conveyors or chain link conveyors.

According to the invention, a series of direction reversible electric motors 18 are individually used to drive conveyors 6, 8, and 10. As described in greater detail below, motors 18 are coupled to a programmable controller 20 which is capable of electronically controlling the operation of each motor, including the direction of rotation. In a preferred embodiment, direction and speed of motor rotation can be controlled directly. However, the invention is not so limited and rotational direction can be altered by means of an electronically operated mechanical clutch and gear systems if desired.

As shown in FIG. 1, the distribution conveyors 8 are upwardly inclined in the downstream direction and the downstream end of each of the distribution conveyors is positioned so that it partially overlaps an upstream end of a successive one of the distribution conveyors. In the case of the last downstream distribution conveyor, the downstream end overlaps the upstream end of the output conveyor 10. The input conveyor 6 is placed upstream from the succession of distribution conveyors 8 with its downstream end partially overlapping the upstream end of a first one of the distribution conveyors.

With the foregoing arrangement, dough conveyed to a downstream end of the input conveyor 6 and each of the distribution conveyors 8, will be caused to drop off such end and thereafter will be drawn by force of gravity to land on the upstream end of the next conveyor in the succession. In this manner, dough is passed from conveyor to conveyor along the conveying path when the conveyors are operating in a forward direction.

Sensor means are provided and associated with each one of the input conveyor 6, the distribution conveyors 8, and the output conveyor 10, for detecting dough logs transported thereon. The sensor means associated with each of the distribution conveyors 8 and the output conveyor 10 includes a position sensor 14 for detecting the presence of a dough log received at an upstream end of each conveyors. Similarly, the output conveyor and the distribution conveyors are each provided with an accumulation sensor 12 for detecting when a dough log is discharged from such conveyors at their respective upstream ends. Finally, an input sensor 16 is provided to detect the presence of dough arriving on input conveyor 6.

Sensors 12, 14, and 16 can be comprised of any suitable transducer element capable of detecting the presence of dough. In a preferred embodiment, photoelectric cells may be used for this purpose. As an alternative, however, weight sensors placed beneath the conveyor surface could also be used to sense for the presence of dough on conveyors and paddle activated switches could be used to sense dough which is discharged from the conveyors.

As noted above, programmable controller means 20 is provided for controlling the operation of input conveyor 6, the distribution conveyors 8, and the output conveyor 10. Conveyor operation by said programmable controller is based on a prioritization program used by the controller, and information received from each of the sensors 12, 14, 16.

As previously explained, each of the distribution conveyors 8 and the output conveyor 10 is capable of reversing its conveying direction, upon command from the programmable controller 20. As may be seen from FIG. 1, when such conveyors operate in their reverse direction, dough is conveyed to their upstream end. When the dough reaches such upstream end, it will thereafter drop off the output or distribution conveyor on which it is traveling, and will be received by a hopper 4 associated with a production line for further dough processing. In this way, each of the conveyors 8, 10 can discharge at its upstream end, dough traveling along the conveying path. The discharged dough from the system according to the invention can thus be provided to a plurality of production lines, each associated with one of the distribution conveyors 8 or the output conveyor 10.

Figure 2:
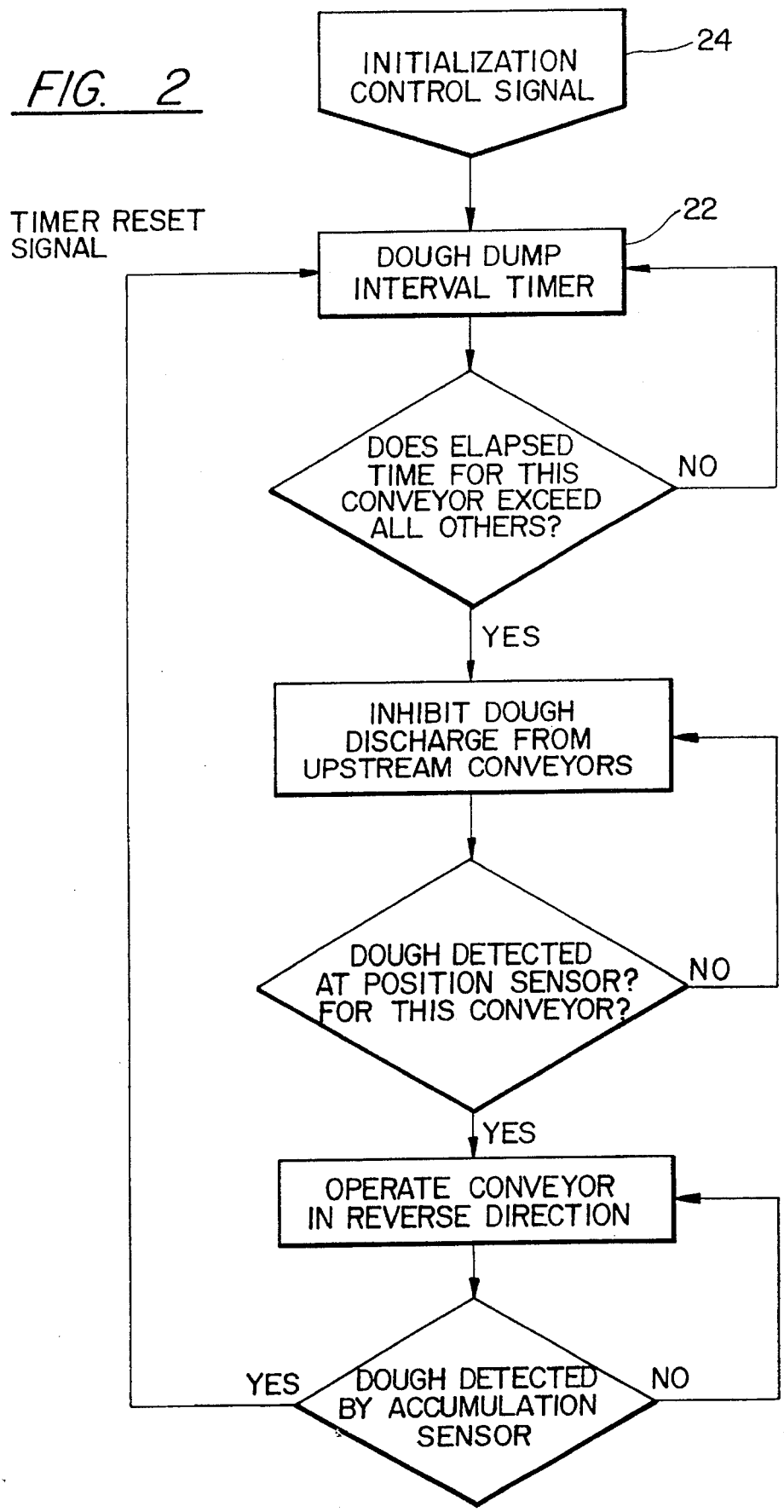
FIG. 2 is a flow chart showing the manner in which priority of dough delivery is determined in the apparatus according to the present invention.

In a preferred embodiment of the invention, the dough-handling apparatus provides for the discharge of dough from the distribution conveyors in a manner which is prioritized by the programmable controller 20. A flow chart of the programmable controller's prioritization program is shown in FIG. 2. In order to control prioritization, the programmable controller is electronically coupled to each of the sensors 12, 14, 16 and to each of the electric motors 18 driving conveyors 6, 8, and 10.

FIG. 2 shows the prioritization flow chart for a single one of the distribution conveyors 8 or the output conveyor 10. As can be seen in FIG. 2, a dough dump interval timer 22 is maintained for determining an elapsed time associated with each conveyor. The programmable controller 20 includes electronic circuitry for receiving an initialization control signal 24 from each of the dough production lines associated with the individual distribution conveyors 8 and the output conveyor 10. The initialization control signal 24 is provided for indicating that the production line associated with the particular conveyor is both active and low on dough. Upon receipt of the initialization control signal, the dough dump interval timer 22, for the particular distribution conveyor or output conveyor associated with the control signal, is initiated by programmable controller 20.

The distribution or output conveyor 8, 10 associated with the dough dump interval timer 22 having the greatest elapsed time has the highest priority for discharging dough. As shown in FIG. 2, the controller 20 will inhibit dough discharge from all upstream distribution conveyors 8 when a downstream conveyor has higher priority, i.e. a higher elapsed time on its dough dump interval timer. The controller 20 will continue to inhibit dough discharge from upstream conveyors in this way until such time as dough is detected by a position sensor 14 associated with the priority conveyor having greatest elapsed time. Once such dough is detected by the position sensor 20, the programmable controller 20 will cause the direction of the priority conveyor to temporarily reverse, thereby causing dough to be discharged from that conveyor at its upstream end. The discharge is detected by accumulation sensor 12.

As shown in FIG. 2, each of the accumulation sensors 12 generates a timer reset signal associated with its respective conveyor when a piece of dough located on such conveyor is discharged from the conveyors' upstream end. The timer reset signal is received by the programmable controller 20, which event causes the controller to reset to zero the elapsed time accumulated on the dough dump interval timer 22 for the particular conveyor.

According to the invention, each of the distribution conveyors 8 and the output conveyor 10, beginning with the output conveyor and proceeding seriatim with each upstream conveyor, will be commanded by the controller 20 to temporarily stop conveying when it determines that: (1) a position sensor 14 associated with a conveyor detects the presence of dough thereon, and (2) when all of the dough dump interval timers 22 of downstream output and distribution conveyors are set to zero. These conditions exist when all of the dough-processing production lines have sufficient dough and more dough is available.

Any distribution conveyor 8 and/or output conveyor 10 which has temporarily stopped, as described above, will thereafter be directed by programmable controller 20 to discharge dough located thereon, by operating in its reverse or upstream direction, when: (1) the elapsed time accumulated on the dough dump timer 22 associated with the particular conveyor exceeds zero, and (2) is greater than the elapsed time on each dough dump interval timer associated with a downstream distribution conveyor 8.

According to the invention, it is anticipated that occasionally, all dough production lines may have sufficient dough in their respective hoppers 4 and more production dough may be arriving at input conveyor 6. Accordingly, if all position sensors 14 associated with distribution conveyors 8 and the output conveyor 10 detect dough located on such conveyors, and additional dough is detected by the input sensor 16, then the output conveyor 10 will convey dough located upon it, in a downstream direction, to an excess dough bin 26. Under these circumstances, all of the distribution conveyors 8 located upstream of the output conveyor 10 will convey dough located upon them to the next adjacent downstream conveyor. Such dough may then be discharged as necessary to supply dough to the various production lines in the manner described above, or may be shifted downstream again, if additional excess dough is detected by sensor 16 as arriving on input conveyor 6.

In an alternative embodiment of the invention designed to avoid discharge of dough to excess dough bin 26, the programmable controller 20 may be provided with a data communication link 28 to a dough mixing unit or other dough feeding device (not shown). Based upon information received with respect to initialization control signals 24 for each distribution conveyor 8, from dough position sensors 14 regarding the number of distribution conveyors 8 which are in the loaded, stopped position and upon data tables stored in the controller's memory, the programmable controller 20 determines when the dough handling machine 2 has, or is about to, receive an excessive amount of dough.

When a condition is thus detected where the dough handling system 2 has, or is about to, receive an excessive amount of dough, the programmable controller 20 electronically communicates with the dough mixer or other dough feeding device via communication link 28 to decrease the rate of dough production and/or delivery. The programmable controller 20 will continue to monitor the information received from dough position sensors 14, and the initialization control signals 24, in order to determine if dough rate of supply has been sufficiently reduced so as not to result in oversupply of dough to the dough handling machine. In the event that the reduction in rate of dough production and/or delivery continues to be excessive and the dough rate of supply cannot be further reduced, then the programmable controller 20 will electronically communicate with the dough mixer or other dough feeding device to cause them to shut down temporarily.

Similarly, if the programmable controller 20 determines, based upon information received from (1) initialization control signals 24 for each distribution conveyor (2) from dough sensors 14, 16, 18 and (3) upon data tables, that the dough handling machine has, or is about to, receive insufficient dough to satisfy production line demands, then the programmable controller 20 will compensate by communicating to said dough mixer and/or dough feeding device by means of said communication link 28, to increase the rate of dough production and delivery.

According to a preferred embodiment of the invention, the programable controller can communicate through communication link 28 to cause the dough mixer rate and/or dough feeding device rate to be varied up to 5% above and below a preset production level. However, the invention is not so limited and alternative limits are also possible.

I claim:

1. An apparatus for the prioritized distribution of dough logs into the hoppers of a plurality of successive dough-handling machines comprising:

an input conveyor, having an upstream end and a downstream end;

a plurality of distribution conveyors placed in succession to one another along a conveying path and capable of transversely carrying dough logs downstream thereon in a first direction along said conveying path, each of said distribution conveyors having an upstream end and a downstream end, said downstream end of each of said distribution conveyors overlapping an upstream end of a successive one of said distribution conveyors;

an output conveyor having an upstream end and a downstream end;

said input conveyor placed upstream from the succession of said distribution conveyors with its downstream end overlapping the upstream end of a first one of said distribution conveyors;

said output conveyor placed downstream from the succession of said distribution conveyors with its upstream end being overlapped by a last one of said distribution conveyors;

sensor means associated with each of said input conveyor, said distribution conveyors, and said output conveyor, for detecting dough logs transported thereon;

programmable controller means for controlling the operation of each of said input conveyor, said distribution conveyors, and said output conveyor based on information received from said sensor means; and each of said distribution conveyors and said output conveyors being configured to reverse its conveying direction from said first direction to an opposite second direction upon command from said programmable controller, thereby permitting said conveyors to discharge at their upstream end, dough traveling on said conveying path, to a production line associated with each of said distribution conveyors and output conveyor.

2. The dough-handling apparatus according to claim 1 wherein the discharge of dough from said distribution conveyors and said output conveyor is prioritized by said programmable controller.

3. The dough-handling apparatus according to claim 2 wherein said sensor means associated with each of said distribution conveyors and said output conveyor includes a position sensor for detecting the presence of a dough log received at an upstream end thereof and an accumulation sensor for detecting when a dough log is discharged from each of said distribution conveyors and said output conveyor at its upstream end.

4. The dough-handling apparatus according to claim 3 wherein said programmable controller maintains a dough dump interval timer for each of said distribution conveyors and said output conveyor for determining an elapsed time.

5. The dough-handling apparatus according to claim 4 wherein said programmable controller includes means for receiving an initialization control signal from each of the production lines associated with said distribution conveyors and said output conveyor, said initialization control signal indicating that an identified one of said production lines is active and low on dough.

6. The dough-handling apparatus according to claim 5 wherein said means for receiving said initialization control signal initiates the dough dump interval timer for the conveyor associated with the production line identified as being active and low on dough.

7. The dough-handling apparatus according to claim 6 wherein each of said accumulation sensors associated with said distribution conveyors and said output conveyor provides a respective timer reset signal when a piece of dough is detected on the conveyors.

8. The dough-handling apparatus according to claim 7 wherein said programmable controller includes means for receiving said timer reset signals from each of said accumulation sensors, said means for receiving said timer reset signals resetting to zero the elapsed time accumulated on the dough dump interval timer associated with a particular conveyor, when the reset signal is received from its respective accumulation sensor.

9. The dough-handling apparatus according to claim 6 wherein the conveyor associated with the dough dump interval timer having the greatest elapsed time has the highest priority for discharging dough.

10. The dough-handling apparatus according to claim 9 wherein dough discharge from all upstream distribution conveyors is inhibited when a downstream distribution conveyor or said output conveyor has highest priority.

11. The dough-handling apparatus according to claim 9 wherein each of said distribution conveyors and said output conveyor, beginning with said output conveyor and proceeding seriatim with each upstream conveyor, will each temporarily stop conveying after said associated dough position sensors detect the presence of dough on said conveyors and, when the dough dump interval timers associated with that distribution conveyor and all downstream conveyors are set to zero.

12. The dough-handling apparatus according to claim 11 wherein each distribution conveyor will discharge dough located thereon when said elapsed time accumulated on said timer exceeds zero and is greater than the elapsed time on each dough dump interval timer associated with all of said downstream distribution conveyors and said output conveyor.

13. The dough-handling apparatus according to claim 12 wherein if all position sensors associated with distribution conveyors and said output conveyor detect dough thereon, and additional dough is detected by said sensor means associated with said input conveyor, the output conveyor conveys dough located thereon in said first direction to an excess dough bin, and the distribution conveyors located upstream thereof will convey dough located upon them to the next adjacent downstream conveyor.

14. The dough handling apparatus according to claim 1 further comprising a communication link for providing electronic communication between said programable controller and a source of dough logs to control the rate of dough delivery to the dough handling apparatus.

15. An apparatus for the prioritized distribution of dough logs into the hoppers of a plurality of successive dough-handling machines comprising:

an input conveyor, a plurality of distribution conveyors, and an output conveyor placed in respective succession to one another along a conveying path and capable of transversely carrying dough logs downstream thereon in a first direction, from said input conveyor to said output conveyor, along said path;

said input conveyor, said plurality of distribution conveyors and said output conveyor having an upstream end and a downstream end;

said input conveyor placed upstream from the succession of said distribution conveyors with its downstream end overlapping the upstream end of a first one of said distribution conveyors;

said downstream end of each of said distribution conveyors overlapping an upstream end of a successive one of said distribution conveyors;

said output conveyor placed downstream from the succession of said distribution conveyors with its upstream end being overlapped by a downstream end of a last one of said distribution conveyors;

sensor means associated with each of said input conveyor, said distribution conveyors, and said output conveyor, for detecting dough logs transposted thereon;

programmable controller means for controlling the operation of each of said input conveyor, said distribution conveyors, and said output conveyor based on information received from said sensor means; and each of said distribution conveyors and said output conveyors being configured to reverse its conveying direction from said first direction to an opposite second direction upon command from said programmable controller, thereby permitting said conveyors to discharge at their upstream end, dough traveling on said conveying path, to a production line associated with each of said distribution conveyors and output conveyor.

16. The dough-handling apparatus according to claim 15 wherein the discharge of dough from said distribution conveyors and said output conveyor is prioritized by said programmable controller.

17. The dough-handling apparatus according to claim 16 wherein said sensor means associated with each of said distribution conveyors and said output conveyor includes a position sensor for detecting the presence of a dough log received at an upstream end thereof and an accumulation sensor for detecting when a dough log is discharged from each of said distribution conveyors and said output conveyor at its upstream end.

18. The dough-handling apparatus according to claim 17 wherein said programmable controller maintains a dough dump interval timer for each of said distribution conveyors and said output conveyor for determining an elapsed time.

19. The dough-handling apparatus according to claim 18 wherein said programmable controller includes means for receiving an initialization control signal from each of the production lines associated with said distribution conveyors and said output conveyor, said initialization control signal indicating that an identified one of said production lines is active and low on dough.

20. The dough-handling apparatus according to claim 19 wherein said programmable controller initiates the dough dump interval timer for the conveyor associated with the production line identified as being active and low on dough upon receipt of said initialization control signal.

21. The dough-handling apparatus according to claim 20 wherein the conveyor associated with the dough dump interval timer having the greatest elapsed time has the highest priority for discharging dough.

* * * * *

UNITED STATES PATENT AND TRADEMARK OFFICE
CERTIFICATE OF CORRECTION

PATENT NO. : 5,611,420
DATED : March 18, 1997
INVENTOR(S) : Heim et al.

It is certified that error appears in the above-indentified patent and that said Letters Patent is hereby corrected as shown below:

Claim 15, column 10, line 10, replace "transposted" with --transported--.

Signed and Sealed this

Fifteenth Day of July, 1997

Attest:

BRUCE LEHMAN

Attesting Officer

Commissioner of Patents and Trademarks